(No Model.)

J. R. SEVERANCE.
WHEEL FOR HARVESTERS.

No. 289,150. Patented Nov. 27, 1883.

WITNESSES
Wm A. Skinkle
Henry A. Lamb

INVENTOR
James R. Severance
By his Attorneys
Baldwin Hopkins & Peyton

UNITED STATES PATENT OFFICE.

JAMES R. SEVERANCE, OF FREMONT, OHIO.

WHEEL FOR HARVESTERS.

SPECIFICATION forming part of Letters Patent No. 289,150, dated November 27, 1883.

Application filed September 27, 1883. (No model.)

*To all whom it may concern:*

Be it known that I, JAMES R. SEVERANCE, of Fremont, in the county of Sandusky and State of Ohio, have invented certain new and useful Improvements in Wheels for Harvesters and other Machines, of which the following is a specification.

My invention relates to improvements in that class of composite wheels which are made partly of wrought metal and partly of cast metal, especially traction-wheels, such as used for road-engines and for mowing and reaping machines.

My objects, chiefly, are to secure strong, light, and durable traction-wheels, and to provide for readily tightening their treads or tires as they become expanded in use.

The subject-matter deemed novel will be particularly pointed out by the claims, after fully describing my improvements as applied to a harvester drive-wheel by reference to the accompanying drawings, in which—

Figure 1:
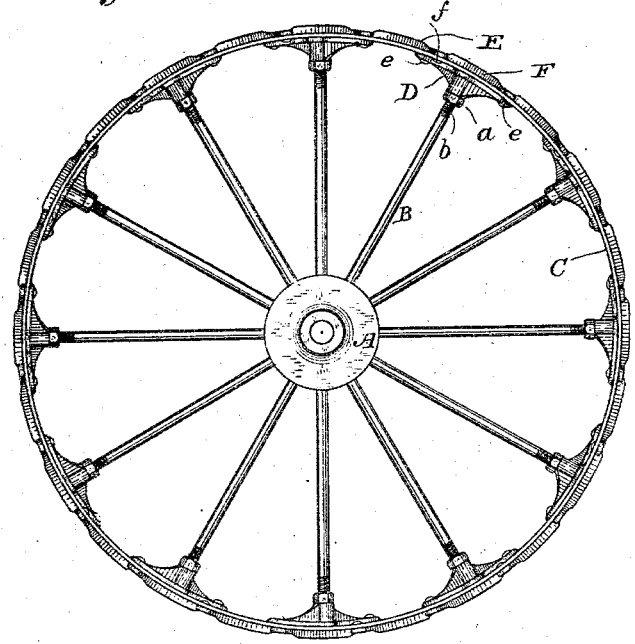
Figure 2:
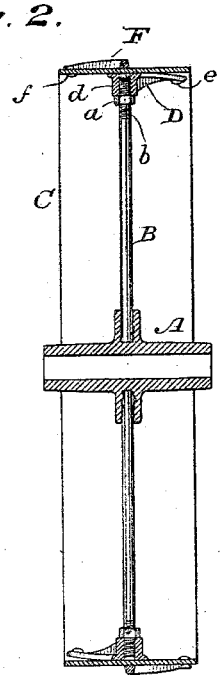
Figure 3:
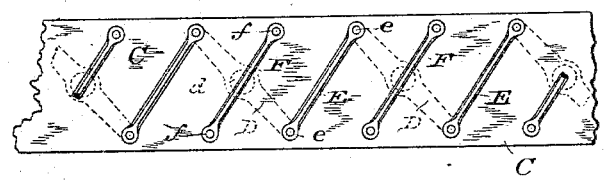
Figure 4:
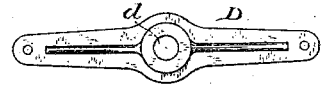
Figure 5:

Figure 1 is an elevation of the wheel, the usually employed internal driving-gear being omitted, as it forms no part of this invention. Fig. 2 is a vertical central section. Fig. 3 is a diagram, showing a portion of the tire as it would appear in plan were it straightened out. Figs. 4 and 5, respectively, show on an enlarged scale a plan and a side view of a spoke clip or shoe for connecting a spoke with the tire.

The hub A of the wheel is of cast metal, and the spokes B and tread or tire C are of wrought metal. The hub is rigidly united to the inner ends of the spokes by being cast about them, as usual in wheels of this class. A screw-thread, $b$, is formed upon the outer end of each spoke, and there is a nut, $a$, upon the threaded end of each spoke. Spoke-clips or bearing-shoes D—one for each spoke—are formed with central sockets or tubular bosses, $d$, to receive the threaded ends of the spokes. The ends of the spokes fit snugly, but loosely enough to prevent binding, in their bearing-sockets in the shoes, and the nuts $a$ take their bearings against the shoes when they are secured to the tire, to adjustably connect the spokes therewith, as presently to be explained. The shoes are best made of cast-iron rendered malleable, and with strengthening flanges or ribs connecting the central bosses with the bases of the shoes, as shown. The shoes are curved slightly, so as to fit snugly against the inner surface of the tire. In adjustably securing the spokes to the tire by means of the shoes, the shoes are first placed upon the ends of the spokes outside of the nuts. The tire is then placed in position, or so as to surround the shoes, and the shoes are rigidly attached to the inner surface of the tire by bolts or rivets passing through perforations in the ends of the shoes. Next, the nuts are screwed outward upon the spokes and against the bosses of the shoes. In this way a strong and readily-adjustable thrust-bearing connection is made between the spokes and tire, and expansion of the tire may quickly be compensated. As the spokes have thrust-bearing connection only with the tire, there is avoided all liability of breakage, such as might result from pulling or tensile strain on the spokes, shoes, and hub, occasioned by expansion of the tire or otherwise.

In order to secure tread-ribs E upon the wheel for a well-known purpose by the same rivets $e$ which secure the spoke-shoes in place, the shoes are arranged diagonally across the tire, and extend nearly from edge to edge thereof, and the ribs E upon the tread or outside of the tire correspond in length and number with the shoes, and, like them, are arranged diagonally and crosswise of the tread, but at right angles with them. In this way the opposite ends of a rib are brought to register, respectively, with one end of each of two adjacent shoes. Two rivets $e$ thus pass through the ends of a rib and through the adjacent ends of a pair of shoes. Additional tread-ribs F—one between each pair of ribs E—are provided. These intermediate ribs are secured by rivets $f\,f$, and, in addition to the usual functions of such ribs, they serve to stiffen and strengthen the tire against the thrusts of the spokes. It should be noticed that the intermediate ribs cross the tire at points where the thrusts of the spokes, by way of the shoe-bosses, are brought to bear upon it.

I claim as of my own invention—

1. The combination, substantially as hereinbefore set forth, of the hub, the tire, the spokes rigidly united to the hub, and the shoes rigidly united to the tire, and having the tubular spoke-sockets, into which the spokes are inserted, and by which they have adjustable thrust-bearing connection with the tire, for the purpose described.

2. The combination of the hub, the tire, the shoes provided with the tubular spoke-sockets, the spokes rigidly united to the hub, and having their threaded ends inserted in the tubular sockets of the shoes, and the nuts on the spokes, substantially as and for the purpose hereinbefore set forth.

3. The combination of the tire, the spoke-shoes, the tread-ribs E, and the rivets passing through the ends of the shoes and ribs, substantially as and for the purpose hereinbefore set forth.

4. The combination of the tire, the spokes, the shoes with which the spokes have thrust-bearing connection, and the tread-ribs F, by which the tire is strengthened and stiffened against the thrust of the spokes, substantially as and for the purpose hereinbefore set forth.

5. The combination of the hub, the spokes, the tire, the diagonal shoes, with which the spokes are adjustably connected, the rivets securing the shoes to the tire, the diagonal tread-ribs E, secured to the tire by the shoe-securing rivets, and the intermediate tread-ribs, substantially as and for the purpose hereinbefore set forth.

In testimony whereof I have hereunto subscribed my name this 24th day of September, A. D. 1883.

JAMES R. SEVERANCE.

Witnesses:
H. S. BUCKLAND,
GEORGE BUCKLAND.